US011845529B2

(12) United States Patent
Bergeler

(10) Patent No.: US 11,845,529 B2
(45) Date of Patent: Dec. 19, 2023

(54) LIGHT FOR A WINDOW OF AN AIRCRAFT
(71) Applicant: Diehl Aerospace GmbH, Ueberlingen (DE)
(72) Inventor: Swen Bergeler, Allershagen (DE)
(73) Assignee: DIEHL AEROSPACE GMBH, Ueberlingen (DE)
( * ) Notice: Subject to any disclaimer, the term of this patent is extended or adjusted under 35 U.S.C. 154(b) by 0 days.
(21) Appl. No.: 17/961,117
(22) Filed: Oct. 6, 2022
(65) Prior Publication Data
US 2023/0104093 A1 Apr. 6, 2023
(51) Int. Cl.
*B64C 1/14* (2006.01)
*F21V 14/00* (2018.01)
(Continued)
(52) U.S. Cl.
CPC .......... *B64C 1/1492* (2013.01); *F21V 14/003* (2013.01); *B64D 2203/00* (2013.01);
(Continued)
(58) Field of Classification Search
CPC ......... B60Q 3/208; B60Q 3/00; F21V 14/003; B64D 2203/00; B64D 2011/0061; F21W 2106/00; F21W 2107/30; F21Y 2105/10; B64C 1/1492; B64C 1/1484; B60J 3/00; B60J 3/04; E06B 2009/2464; B32B 17/10541
See application file for complete search history.

(56) References Cited
U.S. PATENT DOCUMENTS
7,534,016 B2 5/2009 Stavaeus et al.
2007/0186477 A1* 8/2007 Stavaeus ............... B64C 1/1484 49/123
(Continued)

FOREIGN PATENT DOCUMENTS
DE 102006005523 A1 8/2007
DE 60215227 T2 10/2007
(Continued)

OTHER PUBLICATIONS
Haverkamp Clickfilm(R), Elektrochrome Folie für schaltbaren Sichtschutz [electrochromic film for switchable vision protection], product sheet (PDF) ("https://www.haverkamp.de/de/sonnenschutz-und-folientechnologie/architektur/schaltbare-folien/produkt/haverkamp-clickfilm", download on Sep. 30, 2021), cited in spec on p. 2.

*Primary Examiner* — Erin Kryukova
(74) *Attorney, Agent, or Firm* — Scully, Scott, Murphy & Presser, P.C.

(57) ABSTRACT
A pane assembly (2) for a window (8) arranged in the outer wall (4) of an aircraft (6) in a window plane (10) contains a transparent cover pane (12) in a cover plane (14), a switching film (16) in a scattering plane (18), which is switchable between a transparent state (ZT) and a diffuse state (ZD), a luminous film (20) in a light plane (22) having LEDs (24), wherein a spacing (A) between each two LEDs (24) in relation to one another is at least five times their transverse extension (Q), wherein the pane assembly (2) is arranged in front of the window (8) in an installed state (M), so that scattering plane (18), light plane (22), and window plane (10) extend in parallel to one another and the luminous film (20) is arranged between the window (8) and the switching film (16), and window (8), switching film (16), and luminous film (20) are located aligned one behind another on the line of sight (26).
A window assembly (40) contains the window (8) and the pane assembly (2) arranged in front of it in the installed state (M).

10 Claims, 3 Drawing Sheets

(51) Int. Cl.
*F21Y 105/10* (2016.01)
*F21W 106/00* (2018.01)
*F21W 107/30* (2018.01)
*F21Y 115/10* (2016.01)

(52) U.S. Cl.
CPC ..... *F21W 2106/00* (2018.01); *F21W 2107/30* (2018.01); *F21Y 2105/10* (2016.08); *F21Y 2115/10* (2016.08)

(56) References Cited

U.S. PATENT DOCUMENTS

| | | | |
|---|---|---|---|
| 2015/0165965 A1* | 6/2015 | Masaki | B32B 17/10532 |
| | | | 362/513 |
| 2015/0251746 A1* | 9/2015 | Schmid | G02F 1/157 |
| | | | 359/275 |
| 2015/0253486 A1* | 9/2015 | Verger | B60Q 3/51 |
| | | | 362/606 |
| 2015/0354790 A1* | 12/2015 | Ash | F21V 14/08 |
| | | | 362/253 |
| 2018/0101079 A1 | 4/2018 | Tonar | |
| 2018/0182314 A1* | 6/2018 | Staton | G02F 1/133308 |

FOREIGN PATENT DOCUMENTS

| | | |
|---|---|---|
| DE | 202014001058 U1 | 5/2014 |
| DE | 102014003365 A1 | 9/2015 |
| EP | 1526999 B1 | 10/2006 |
| WO | 2014124622 A1 | 8/2014 |
| WO | WO-2023017055 A1 * | 2/2023 |

\* cited by examiner

LIGHT FOR A WINDOW OF AN AIRCRAFT

BACKGROUND OF THE INVENTION

The invention relates to a window which is arranged in the outer wall of an aircraft.

DISCUSSION OF THE PRIOR ART

A window for an aircraft having a pressurized cabin is known from DE 10 2014 003 365 A1, wherein an outer pane facing away from a cabin interior in an installed state and an inner pane facing toward the cabin interior are held in a frame, so that a gap is formed between the outer and the inner pane. One of the inner and the outer panes is provided with a transparent first layer made of organic light-emitting diodes to provide a light function.

SUMMARY OF THE INVENTION

The present invention is directed to improvements with respect to a window in the outer wall of an aircraft.

More particularly, the present invention is directed to a pane assembly to be employed or used for a window intended to be arranged in the outer wall of an aircraft, thus to be attached on and/or in front of this window in an installed state. "Intended" means that the pane assembly is adapted in its design to a specific type of window, possibly also an aircraft or its outer wall or cabin, for example, also to a window funnel adjoining the window toward the interior of the aircraft, and is configured for use there; for example, is designed for the geometry requirements thus defined, etc. In other words, a relevant window, window funnel, etc. is presumed to be known with respect to its geometry, etc. The window is in particular such a window of a passenger cabin of an aircraft, in particular a commercial aircraft or jet.

The invention presumes that the window extends in a window plane. "Extends" means that the window or its windowpanes extend flatly. The window or its pane or panes can be flat or also—as is typical in practice—slightly curved. This definition also applies accordingly to the extension of other objects, see below.

The pane assembly contains a mechanically stable, optically transparent cover pane, which extends in a cover plane. "Mechanically stable" is to be understood here as distinguished from a flexible film. "Optically transparent" means that an observer can see through the cover pane as through a typical clear windowpane, he does not "see" the cover pane itself upon viewing in this meaning or his visibility is not interfered with or impaired.

The pane assembly contains a switching film, which extends in a scattering plane parallel to the front plane. The switching film is electrically switchable between a transparent state and a diffuse state. Such a switching film is known, for example, as a switchable electrochromic window film for building technology from "Haverkamp Clickfilm®, Elektrochrome Folie für schaltbaren Sichtschutz [electrochromic film for switchable vision protection]", product sheet (PDF) ("https://www.haverkamp.de/de/sonnenschutz-und-folien-technologie/architektur/schaltbare-folien/produkt/haverkamp-clickfilm", download on 30.09.2021). In the transparent state, an observer can look unobstructed through the switching film as through a typical transparent windowpane (see above). In the diffuse state, the switching film causes scattering of greater or lesser strength (depending on the diffusivity) of light passing through the switching film. For example, the switching film is then comparable in this respect to a "frosted glass" pane, which does permit light to pass brightly more or less unobstructed, but scatters it.

The pane assembly furthermore contains a luminous film, which extends in a perpendicular distance to the switching film in a light plane in parallel to the cover plane. A plurality of LEDs and electrical supply lines for the power supply and optionally the activation (rightness, colour, . . . ) of the LEDs are arranged on the luminous film, the base film of which is itself transparent (see above). A spacing (in the extension direction/extension plane of the film or the light plane) between each two LEDs from one another is at least five times the transverse extension of a single LED. The transverse extension here is the maximum extension of an LED also in the extension direction/extension plane of the film or the light plane. In particular, the LEDs have dimensions in the range of 150 µm×150 µm and are arranged in relation to one another in a square grid as a matrix, and are spaced apart approximately 5 mm from one another at the same time. The luminous film is thus a transparent film material which is equipped with electrically contacted LEDs.

The pane assembly is configured to be arranged in front of the window in the above-mentioned intended installation state in the direction of a line of sight perpendicular to the window plane toward the interior of the aircraft. And specifically in such a way that scattering plane, light plane, and window plane extend in parallel to one another and the luminous film is arranged between the window and the switching film and window, switching film, and luminous film are located aligned one behind another on the line of sight. The line of sight corresponds to the observation direction, which is perpendicular to the window or its panes, thus the window plane, of an occupant of the aircraft through the window out of the aircraft.

Viewed from the interior of the aircraft (the installation state is always presumed here), the luminous film is thus arranged behind or beyond the switching film. With switching film in the diffuse state and activated, thus light-emitting LEDs, the light emitted by them toward the interior is thus diffusely scattered on the switching film, so that the switching film appears as a backlit uniformly lighted luminous surface and the individual, light-generating LEDs are no longer identifiable (behind it). This results in a particularly pleasant light perception in the interior.

An observer located in the interior of the aircraft can nonetheless—in particular with LEDs switched off and switching film in the transparent state—look through the cover pane, the switching film, and the luminous film at the window and through it out of the aircraft. The LEDs and lines on the luminous film are then not perceived or are not perceived in an interfering manner because of the observer distance then provided.

In particular, the pane assembly is configured so that the switching film assumes the transparent state when the LEDs are switched off/passive, thus do not emit light; and the switching film assumes the diffuse state when the LEDs are switched on/active, thus emit light.

The LEDs are in particular configured to emit light during their operation in the direction toward the switching film or in the installed state thus in the direction of the line of sight toward the interior and in particular to illuminate the switching film uniformly here.

In other words, it is proposed according to the invention that the window be supplemented toward the interior of the vehicle by at least one additional pane (cover pane) arranged in front of the window and films functionally connected upstream (switching film, luminous film) to form a functional "overall window" (window assembly, see below).

In one preferred embodiment, the switching film is arranged on the cover pane. It can alternately be arranged here on an inside (facing away from the luminous film, facing toward the interior in the installed state) or on an outside of the cover pane opposite thereto. The inside thus faces toward the interior of the aircraft and the outside toward the window in the installed state. In particular, the switching film thus forms a corresponding coating of the cover pane. The switching film is held securely and well in this way and an additional mount/stabilization/carrier for the switching film can be omitted.

In one preferred variant of this embodiment, the switching film is arranged on the above-explained inside of the cover pane and the luminous film is arranged on the outside of the cover pane. A mount/stabilization/carrier for the luminous film is thus also dispensed with. This solution suggests itself in particular if the diffusivity of the diffuser film (switching film) and material thickness of the clear pane (cover pane) are sufficient, so that additional carrier material for the films is not necessary. Inside and outside are to be understood accordingly as explained above with respect to the cover pane.

In one preferred embodiment, the pane assembly contains a carrier pane different from the cover pane, which is also transparent as explained above, however. The luminous film is then arranged on the carrier pane. The carrier pane can correspond here in material/embodiment, etc. to the cover pane; the above explanations on the cover pane also apply accordingly to the carrier pane. In this way, the luminous film can in particular be arranged with sufficient distance to the switching film, which with increasing distance permits more uniform scattering of the light generated by the luminous film (LEDs) at the switching film in the diffuse state.

In one preferred variant of this embodiment, the switching film is arranged on an inside of the carrier pane and the luminous film is arranged on an outside of the carrier pane. Inside and outside are to be understood accordingly as explained above with respect to the cover pane. This permits a cover pane to be used on which neither the switching film nor the luminous film is arranged. If the cover pane is damaged (e.g., scratches, cracks, etc.), it can be replaced easily; the cover pane can be used as a simple and cost-effective protective pane toward the interior for films etc. of the pane assembly and the window located behind it in this respect.

In one preferred embodiment, the luminous film is configured to be arranged on a pane of the window in the installed state. In the installed state or when the window is present, the luminous film is thus part of the window or applied thereon, in particular as a coating. In this embodiment, it is presumed that the intended window has at least one pane, in particular a double or multiple glazing having two or more panes. In particular, the luminous film is applied in the installed state to the inside (to be understood as above) of the innermost pane (facing toward the interior of the aircraft). The LED matrix film (luminous film) can thus in particular also be applied to the inner window (inside thereof).

In one preferred embodiment, at least two of the LEDs are electrically activatable independently of one another. Different illumination situations, for example, brightness gradients can thus be generated by the pane assembly or on the switching film in the diffuse state also, for example, colour gradients etc. if the LEDs are capable of emitting coloured light.

In one preferred embodiment, the switching film is additionally switchable into a dark state. In the dark state, less light penetrates through the switching film than in the diffuse state and/or transparent state, in particular light incident through the window is darkened sufficiently in the installed state, for example, to act as a dimming effect comparable to pulling down a blind for a passenger seated at the window. An additional blind on the window can thus be omitted.

Alternatively—to achieve the same effect only with an additional component—an additional/separate pane/film could also be provided in the pane assembly, which is electrically switchable between a transparent state comparable to that of the switching film and the dark state.

The present invention is also achieved by a window assembly containing the pane assembly proposed above and the window mentioned in this context. The pane assembly is then located in the above-mentioned installation state in front of the window in the direction of the line of sight perpendicular to the window plane toward the interior of the aircraft or is arranged there.

The window assembly and at least a part of its possible embodiments and the respective advantages were already explained accordingly in conjunction with the pane assembly according to the invention.

As already explained above, in one preferred embodiment the luminous film is arranged in the installed state on a pane of the window.

In one preferred embodiment, the window assembly contains, in addition to the window, a further (intended) part of the aircraft as follows: The window assembly contains a window funnel recessed from an inner wall of the aircraft. The window funnel ends—facing toward the outer wall of the aircraft—at the window. The window assembly is then arranged inside the window funnel. The window assembly then does not require further installation space in the interior of the aircraft delimited by the inner wall, for example, of a passenger cabin.

The cover pane in particular continues the inner wall flatly, thus terminates in particular with an end face of the window funnel facing away from the window. Alternatively, the cover pane is arranged offset from the inner wall/the end face of the window funnel toward the window. This results in solutions which are each differently designed visually, which can be selected depending on the taste of the user.

The invention is based on the following findings, observations, and considerations and also includes the following embodiments. The embodiments are sometimes also called "the invention" here for simplification. The embodiments can in this case also include parts or combinations of the above-mentioned embodiments or correspond thereto and/or can possibly also include embodiments which have not been previously mentioned.

A "window light" results according to the invention. Due to the combination of the technology "LED matrix on transparent carrier material (luminous film)" and the technology "switchable diffuser film" (switching film), transparent surfaces (the mentioned panes/films) can be made usable as a light and information surface and the original function of the transparency can be retained (in the transparent state/with inactive LEDs). The effect is based on the use of novel technologies for lighting or visualization in aircraft.

Due to the combination of both technologies (switching film/luminous film) a novel window light results. The luminous films, also "LED matrix films on transparent carrier material (film)" are LEDs having very small active luminous area (for example, 150 μm×150 μm) which are arranged in a grid of, for example, 5 mm as a matrix and are applied to a transparent film as a supporting film. In the non-energized state, the luminous film/matrix appears transparent, since lines (for powering/activating the LEDs) and LEDs are no longer visible to the human eye from a low visibility distance.

In the energized state, the very small light spots of the LEDs are visible. A diffuser is therefore furthermore advantageous. Simple (permanently diffuse) diffuser material obstructs the transparency of the window (looking through the window). It is therefore more advantageous if the diffuser material can either be moved away mechanically. This could be achieved, for example, by a roller blind or curtain or a displaceable pane. It is even better, as proposed here, however, if the diffuser material (switching film) can be switched transparent. Passive diffuse films (diffuse in the state free of current/voltage) and passive transparent films (transparent in the state free of current/voltage) are conceivable. If one moves the switching film to a sufficient distance from the LED matrix (luminous film), the LED light spots thus blur upon observation of the switching film from the interior in the diffuse state and a homogeneous luminous surface results on the switching film.

Due to the proposed solution, a fully novel light experience results in the aircraft. For example, lights like animated sunrises or sunsets or also a display of symbols or text are possible by corresponding individual activation of possibly coloured LEDs. The basic functions of a conventional aircraft window (transparency and possibly dimming) are retained. The solution is integratable into overall lighting scenarios. The (expanded) window or the window assembly becomes an illumination surface. Depending on the potential of the luminous film used, colour gradients or also blurred motifs are displayable (for example, a sunrise to minimize jetlag after long-haul flights). The proposed solution does not require any changes in the lining or cabin panel. The solution is usable in all aircraft. A use is also possible in the retrofit market, for example, by replacing the mechanical dimming by a pane having diffuser film (switching film). The functionalities provided by the pane assembly can be controlled/remote-controlled electrically and therefore centrally. For example, flight attendants no longer have to ask each passenger individually to operate the window dimmers or bend over the seats to operate them themselves, but rather can switch/produce the transparency of the window assemblies centrally. A positive effect results for the lighting situation at the window seat.

The proposed solution is usable particularly advantageously in aircraft, but can possibly also be used for windows or other transparent surfaces (for example, partition walls) in other vehicles (bus, train, ship).

The proposed solution thus also relates to a light for the interior of a vehicle, wherein a defined surface (for example window) is transparent (transparent state, LEDs inactive) or is used as a luminous surface (diffuse state, LEDs active).

Transparent materials are installed in vehicles, for example, buses, ships, trains, and aircraft, to achieve transparency (for example, partition walls, windows). Thanks to the proposed solution, these transparent surfaces can be made usable as a lighting and information surface and at the same time the original function of the transparency can be retained. The already provided pane can in particular function as a cover pane here. The minimal solution is thus the application of a switching and luminous film on both sides of a cover pane and the use of the cover pane in the vehicle, for example, as a partition wall which is modified, transparent, or switchable as a light assembly.

BRIEF DESCRIPTION OF THE DRAWINGS

Further features, effects, and advantages of the invention result from the following description of a preferred exemplary embodiment of the invention and the appended figures. In the figures, in each case in a schematic diagram.

DETAILED DESCRIPTION OF THE INVENTION

Figure 1:
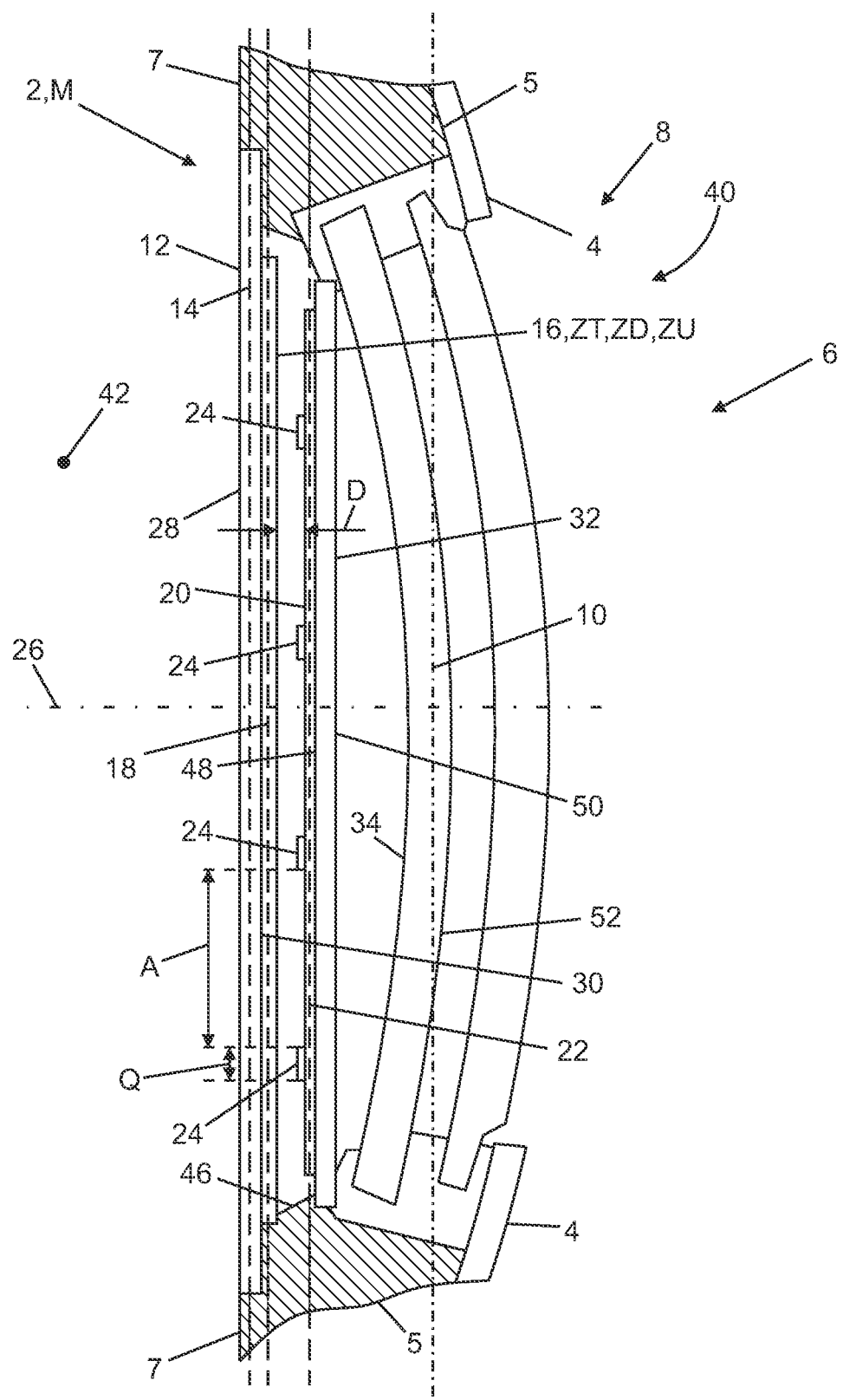
FIG. 1 shows a cross section through a side wall of an aircraft in the region of a window assembly.

FIG. 1 shows a cross section through a side wall of an aircraft 6. The side wall comprises an outer wall 4 of the aircraft 6 and a structural layer 5 not explained in more detail (insulation/panels/ . . . ), which ends at an inner wall 7 of an interior 42, a passenger cabin here, and is symbolically indicated here by shading.

A window 8 is arranged in the outer wall 4, through which passengers located in the interior 42 can look out of the aircraft 6 along a line of sight 26. A window funnel 46, which is incorporated into the structural layer 5, extends along the line of sight 26 and begins at the inner wall 7 and ends at the window 8.

The window 8 extends in a window plane 10, which extends in the region of the window 8 in parallel or tangentially to the outer wall 4 of the aircraft 6 and is perpendicular to the plane of the drawing in FIG. 1.

A pane assembly 2 is arranged in the window funnel 46 in an installed state M, which forms a window assembly 40 together with the window 8.

The pane assembly 2 contains a cover pane 12, which is formed flat here and extends in a cover plane 14, which in turn extends in parallel to the window plane 10. The cover pane 12 is a mechanically stable, optically transparent pane here, thus a transparent pane. The cover pane 12 has an inside 28 facing toward the interior of the aircraft 6, the interior 42 here, and an opposing outside 30.

The pane assembly 2 contains a switching film 16, which is arranged here on the outside 30 of the cover pane 12, is firmly applied here. The switching film 16 is therefore also formed flat in the present case and extends in a scattering plane 18. The switching film 16 is electrically switchable between a transparent state ZT and a diffuse state ZD and a dark state ZU. In the transparent state ZT, the switching film 18 is transparent like conventional clear glass, in the diffuse state ZD it scatters incident light like a frosted glass pane, and in the dark state ZU, it prevents the passage of light like a conventional window blind, manually displaceable up and down or manually operable, for aircraft in the closed state.

The pane assembly 2 furthermore contains a luminous film 20, which is located at a perpendicular distance D (in relation to the cover plane 14) to the switching film 16. The luminous film 20 is applied to a flat carrier pane 32, which corresponds in its optical properties to the cover pane 12, thus is optically transparent. The switching film 16 therefore also extends in a light plane 22, which extends in parallel to the scattering plane 18. LEDs 24 are arranged on the luminous film 20. These are arranged on the film of the luminous film 20 supporting them in a 5 mm×5 mm cross matrix and are electrically connected by lines (not shown in FIG. 1) and are supplied via these lines with energy and control signals for brightness and colour of their emitted light. Only four of the LEDs 24 are shown by way of example in FIG. 1. A spacing A between the LEDs 24 is 5 mm here. The LEDs 24 themselves have square dimensions of 150 µm×150 µm and thus a transverse extension Q of 150 µm here.

In the installed state M, the pane assembly 2 is arranged in front of the window 8 in the direction of the line of sight 26 perpendicular to the window plane 10 toward the interior 42, thus the passenger cabin. Light plane 22, scattering plane 18, and window plane 10 extend in parallel to one another and the luminous film 20 is arranged between the window 8 and the switching film 16. Window 8, switching film 16, and luminous film 20 are located aligned with one another on the line of sight 26.

The LEDs 24 are electrically activatable independently of one another, so that in the vertical direction (in relation to the floor of the interior 42 or the passenger cabin), a sunrise can be simulated. For this purpose, the LEDs 24 are activated to emit light at various heights in various colours in order to generate a colour gradient beginning dark blue from the bottom, upward via light blue and red toward orange on the switching film 16 in the diffuse state ZD.

In FIG. 1, the pane assembly 2 is arranged terminating flush in the window funnel 46 toward the interior 42. I.e., the cover pane 12 terminates flush with the inner wall 7 of the side wall.

Figure 2:
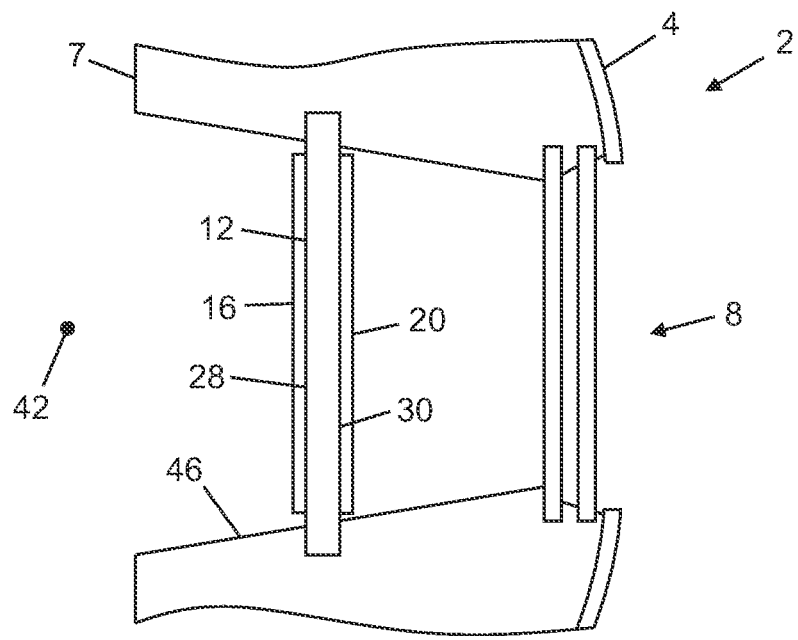
FIG. 2 shows an alternative pane assembly of the window assembly in the cross section according to FIG. 1 with recessed cover pane and alternative film assembly on the cover pane.

FIG. 2 shows an alternative embodiment of a pane assembly 2. The pane assembly 2 is set back in the window funnel 46 toward the window 8 here, that is to say the cover pane 12 is set back behind the inner wall 7 away from the interior 42. The switching film 16 is applied to the inside 28 and the luminous film 20 is applied to the outside 30 of the cover pane 12 here. The LEDs 24 are not shown in FIGS. 2 to 4 for the sake of clarity. The carrier pane 32 is therefore omitted here.

Figure 3:
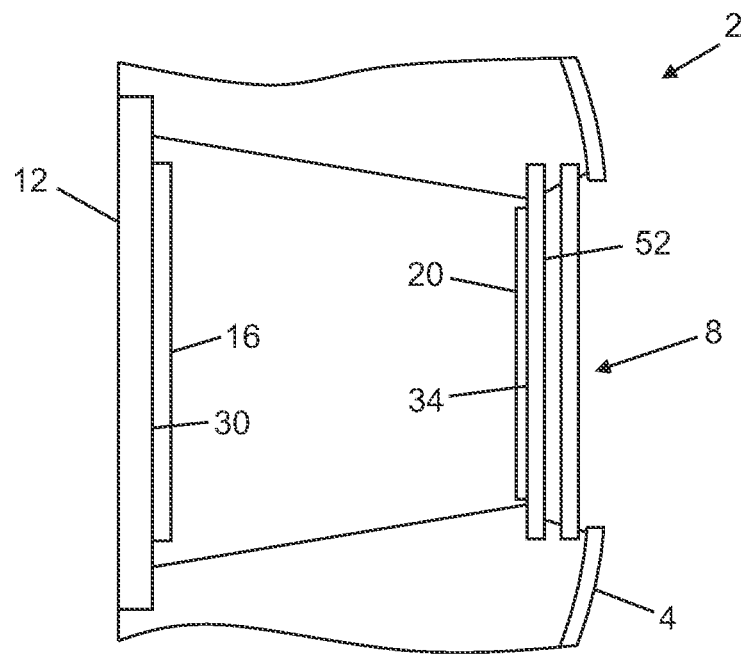
FIG. 3 shows an alternative pane assembly in the cross section according to FIG. 1 with film assembly on the cover pane and a window of the window assembly.

FIG. 3 shows another alternative embodiment of a pane assembly 2. The luminous film 20 is attached to an inside 34 of a pane 52 of the window 8 here. In contrast, the switching film 16, as in FIG. 1, is arranged on the outside 30 of the cover pane 12. The carrier pane 32 is also omitted here.

Figure 4:
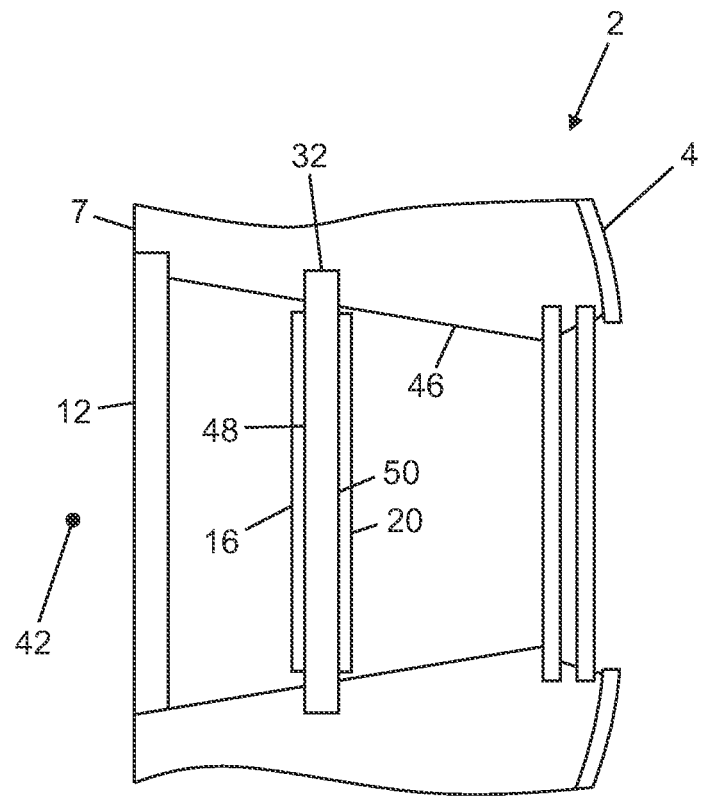
FIG. 4 shows an alternative pane assembly in the cross section according to FIG. 1 with film assembly on a carrier pane.

FIG. 4 shows another alternative embodiment of a pane assembly 2. The switching film 16 is applied here to an inside 48 and the luminous film 20 to an outside 50 of the carrier pane 32. The cover pane 12 is embodied here without functional films (switching film 16, luminous film 20) and is only used to protect the remaining window assembly 2 toward the interior 42.

LIST OF REFERENCE SIGNS 2 pane assembly
4 outer wall (aircraft)
5 structural layer
6 aircraft
7 inner wall (aircraft)
8 window
10 window plane
12 cover pane
14 cover plane
16 switching film
18 scattering plane
20 luminous film
22 light plane
24 LED
26 line of sight
28 inside (cover pane)
30 outside (cover pane)
32 carrier pane
34 inside (window)
40 window assembly
42 interior
46 window funnel
48 inside (carrier pane)
50 outside (carrier pane)
52 pane (window)
M installed state
ZD diffuse state
ZT transparent state
ZU dark state
D distance (switching film/luminous film)
A spacing (LEDs)
Q transverse extension

What is claimed is:

1. A pane assembly for a window arranged in the outer wall of an aircraft, which extends in a window plane, comprising
   a mechanically stable, optically transparent cover pane, which extends in a cover plane,
   a switching film, which extends in a scattering plane parallel to the cover plane and is electrically switchable between a transparent state and a diffuse state,
   a luminous film, which extends at a perpendicular distance to the switching film in a light plane parallel to the scattering plane, wherein a plurality of LEDs are arranged on the luminous film, wherein a spacing between each two LEDs in relation to one another is at least five times their transverse extension,
   wherein the pane assembly is configured, in an intended installed state, to be arranged in front of the window in the direction of a line of sight perpendicular to the window plane toward the interior of the aircraft, so that the scattering plane, the light plane, and the window plane extend in parallel to one another and the luminous film is arranged between the window and the switching film and the window, the switching film, and the luminous film are located aligned one behind another on the line of sight.

2. The pane assembly according to claim 1, wherein the switching film is arranged on the cover pane.

3. The pane assembly according to claim 2, wherein the switching film is arranged on an inside of the cover pane and the luminous film is arranged on an outside of the cover pane.

4. The pane assembly according to claim 1, wherein the pane assembly contains a carrier pane different from the cover pane, on which the luminous film is arranged.

5. The pane assembly according to claim 4, wherein the switching film is arranged on an inside of the carrier pane and the luminous film is arranged on an outside of the carrier pane.

6. The pane assembly according to claim 1, wherein the luminous film is configured to be arranged on a pane of the window in the installed state.

7. The pane assembly according to claim 1, wherein at least two of the LEDs are electrically activatable independently of one another.

8. The pane assembly according to claim 1, wherein the switching film is additionally switchable into a dark state.

9. A window assembly having the pane assembly and the window according to claim 1, in front of which the pane assembly is arranged in the installed state in the direction of the line of sight toward the interior of the aircraft.

10. The window assembly according to claim 9, wherein the window assembly contains a window funnel set back from an inner wall of the aircraft, which ends at the window, wherein the window assembly is arranged inside the window funnel.

\* \* \* \* \*